(12) United States Patent
Plantan et al.

(10) Patent No.: US 9,097,304 B2
(45) Date of Patent: Aug. 4, 2015

(54) DISC BRAKE PAD MOUNTING AND RETENTION SYSTEM AND METHOD

(71) Applicant: Bendix Spicer Foundation Brake LLC, Elyria, OH (US)

(72) Inventors: Ronald S. Plantan, Elyra, OH (US); Lonnie F. Cool, North Olmsted, OH (US); Harish Radhakrishnan, Westlake, OH (US)

(73) Assignee: Bendix Spicer Foundation Brake, LLC, Elyria, OH (US)

( * ) Notice: Subject to any disclaimer, the term of this patent is extended or adjusted under 35 U.S.C. 154(b) by 127 days.

(21) Appl. No.: 13/673,404

(22) Filed: Nov. 9, 2012

(65) Prior Publication Data

US 2014/0131148 A1     May 15, 2014

(51) Int. Cl.
*F16D 65/095* (2006.01)
*F16D 65/00* (2006.01)
*F16D 65/097* (2006.01)

(52) U.S. Cl.
CPC .......... *F16D 65/097* (2013.01); *F16D 65/0972* (2013.01); *Y10T 29/49815* (2015.01); *Y10T 29/49826* (2015.01)

(58) Field of Classification Search
CPC . F16D 65/097; F16D 65/095; F16D 65/0006; F16D 65/0972; F16D 65/0978; F16D 65/0979; F16D 65/092; F16D 55/227; F16D 2055/0008; F16D 2055/0016; F16D 2055/0091
USPC .................................... 188/313, 73.38, 73.31
IPC ..................................................... F16D 65/097
See application file for complete search history.

(56) References Cited

U.S. PATENT DOCUMENTS

| | | | |
|---|---|---|---|
| 4,134,477 A | 1/1979 | Asquith | |
| 4,609,077 A * | 9/1986 | Nakatsuhara | 188/73.38 |

(Continued)

FOREIGN PATENT DOCUMENTS

| | | |
|---|---|---|
| DE | 40 32 886 A1 | 4/1992 |
| DE | 100 50 013 A1 | 4/2002 |

OTHER PUBLICATIONS

International Search Report Dated Apr. 4, 2014 (three (3) pages).

(Continued)

*Primary Examiner* — Anna Momper
*Assistant Examiner* — San Aung
(74) *Attorney, Agent, or Firm* — Crowell & Moring LLP

(57) ABSTRACT

A system and method are provided for retaining brake pads in disc brakes, such as air-operated disc brakes utilized on commercial vehicles, and for installing and removing brake pads, without the need to employ brake pad retaining devices which radially over-top the brake pads. A preferred embodiment includes a retaining element, preferably a spring steel clip, having protrusions which face in opposite directions to engage corresponding slots in a brake pad lateral edge and in a brake pad carrier brake pad-facing surface. When installed in a radially-inward direction, the brake pad carrier side protrusion engages the brake pad carrier slot, and cooperates with the brake pad lateral side protrusion to resist brake pad movement in the radially-outward direction. The brake pad carrier side protrusion may be manually pressed toward the brake pad to disengage the protrusion from the carrier slot to permit withdrawal of the brake paid from the carrier.

16 Claims, 10 Drawing Sheets

(56) References Cited

U.S. PATENT DOCUMENTS

| | | | |
|---|---|---|---|
| 2005/0023090 A1* | 2/2005 | Mackiewicz | 188/218 XL |
| 2005/0274579 A1* | 12/2005 | Nogiwa | 188/73.38 |
| 2006/0070828 A1* | 4/2006 | Hendrich et al. | 188/73.31 |
| 2007/0227839 A1* | 10/2007 | Barrett et al. | 188/73.31 |
| 2008/0277215 A1 | 11/2008 | Klement et al. | |
| 2010/0243389 A1* | 9/2010 | Miura et al. | 188/206 R |

OTHER PUBLICATIONS

Written Opinion Form PCT/ISA/237 Dated Apr. 4, 2014 (six (6) pages).

* cited by examiner

DISC BRAKE PAD MOUNTING AND RETENTION SYSTEM AND METHOD

BACKGROUND AND SUMMARY OF THE INVENTION

The present invention relates to disc brakes for vehicles, and in particular to a system and method for mounting and retaining brake pads in disc brakes, such as air-operated disc brakes utilized on commercial vehicles.

Pneumatically-operated disc brakes have been undergoing development and deployment on commercial vehicles since at least the 1970's, and are beginning to replace drum-style brakes due to advantages in areas such as cooling, fade resistance and serviceability. German Patent Publication No. DE 40 32 886 A1, and in particular FIG. 1 of the German reference, discloses an example of such an air disc brake. In this design, a pneumatic diaphragm chamber (pneumatic actuator) is attached to a rear face of the disc brake caliper housing, and applies a brake actuation force through a linear actuator rod to a broke actuator lever within the caliper. The brake's actuator lever in turn transfers and multiplies the force applied by the actuator rod to one or more spindles, which force brake pads against a brake disc or rotor. The terms "brake disc," "rotor" and "brake rotor" are used interchangeably herein.

As shown in FIG. 1 of DE 40 32 886 A1, the actuator is located inboard of the brake caliper, in large part because commercial vehicle wheel rims are sized to only provide adequate clearance for the drum-type brakes historically employed on such vehicles. Because the resulting space envelope between the wheel and its axle is limited, the actuator must be located into the space adjacent to the wheel. For the same reason, brake pads must be configured to conform to the limited available radial space, and thus have typically been located and retained on one of the brake caliper or brake caliper carrier/mount using transverse suspension pins and/or using leaf spring-type metal strips disposed over the outer radius of the brake pads. Brake pads have also been retained by capturing the brake pads between the caliper mounting frame and the portion of the brake caliper which straddles the brake disk. (As one of ordinary skill will recognize, the same brake pad support function may be provided by a brake caliper carrier/mount designed to support the brake pads or by a brake pad carrier which is separate from the caliper mounting structure. For convenience in this description, the terms caliper carrier, caliper mount and brake pad carrier may be interchanged without intending to limit the brake pad supporting structure to any specific brake pad and brake caliper carrying structure.)

Conventional commercial vehicle air disc brakes have typically required the installation of ancillary brake pad retention mechanisms such as a retaining bar arranged transversely across the top of the brake pads. Such arrangements require additional space above the brake pads, which in turn requires taller brake calipers. With the opposing constraint of little available clearance between the inside of the wheel rim and the outer envelope of the brake caliper, it is difficult to accommodate such brake pad retention mechanisms without thinning the caliper and thereby increasing the stress levels in the caliper material and decreasing the caliper's useful service life (e.g., decreased fatigue life).

A further problem with prior art brake pads is the tendency for the brake pad to rotate and/or vibrate during brake operation. As illustrated in FIG. 1, when a brake pad 101 is applied against a friction surface of a brake disk (not illustrated) which is rotating in direction DR, the brake disk's rotation induces motion and reaction forces between the brake pad 101 and its adjacent mount abutment surfaces (not illustrated for clarity). Specifically, at the leading edge 102 of the brake pad the brake pad attempts to move upward in direction LU in response to the friction forces along the face of the brake pad (illustrated here by force arrows across the face of brake pad 101). At the trailing edge 103 of the brake pad, the brake pad attempts to move downward in direction TD. However, because the brake pad 101 is constrained by adjacent mount abutment surfaces, the overall motion of the brake pad is generally a rotation about an axis parallel to the brake disk rotation axis. This motion may be unilateral during the brake application, or may manifest itself as a moderate-to-severe oscillation of the brake pad in its mount, significantly increasing wear of the abutting brake pad and mount surfaces.

In order to prevent undesired rotation and/or vibration of the brake pad within its mounting (for example, rotation about the brake application direction), the brake pad backing plate and the adjacent mounting bracket horns supporting the brake pads in the circumferential direction required a relatively tall radial height to minimize the amount of brake pad rotation before a corner of the backing plate contacted the adjacent mount horn (a motion referred to as "pad kick" or "pad turnout," caused by "twisting" or "tipping" of the pad in the caliper as the rotating brake disk attempts to raise one end of the brake pad while pushing down on the other end of the brake pad). This relatively tall structure in turn would require the brake caliper, which is installed over the brake pads and mounting bracket, to have its corresponding opposing inner surfaces radially outboard of the mount horns be relieved enough to accommodate the outer corners of the brake pad and/or mount horns. This thinning again may cause stress level and fatigue life problems. Because the maximum outer radius of the brake caliper is typically constrained by very tight clearance to the inside of the adjacent wheel rim, the brake caliper arms straddling the brake disc between the application side and the reaction side of the caliper may have to be made thinner than desired in order to accommodate both the tall carrier mount horn and the close-fitting wheel rim. This can lead to very high tensile and bending stresses in the thin regions and thus reduction in fatigue life and service life.

The present invention addresses these and other problems by providing a brake pad mounting and retention arrangement and method of installation and removal which provides for minimum pad kick motion, elimination of the need for overtopping brake pad retention devices, inherently vibration- and noise-reducing mounting, and lower mount horn height which in turn permits increased brake caliper strength and service life.

In one embodiment of the present invention a brake pad is provided with slots on its lateral and bottom edges arranged to receive a correspondingly-shaped spring element. The spring element in turn has side extensions, such as tabs, which conform to the width of the brake pad carrier and serve to both align and guide the brake pad into position during installation and lock the spring element into place against lateral motion toward or away from the brake disc as the brake pad is advanced or withdrawn from the brake disc. The spring element is further provided with a retention feature on a top surface which may engage a corresponding slot or relief in the pad-side face of the adjacent mount's horn. The retention feature may be an angled tab which permits the brake pad and spring element to be inserted as an assembly vertically downward (i.e., radially inward toward the vehicle axle) in to the mount until the upper retaining feature reaches its corresponding mount relief and elastically springs outward. With this arrangement, during in-service brake operations the brake pad is retained in the brake in a simple and positive manner by the combination of: (i) the upper retention feature snapping into the mount relief; and (ii) the spring element having a protrusion which extends into one of the slots in the edge of the brake pad. A further extension of the spring element which engages the slot on the lower edge of the brake pad may also be provided to assist in retaining the spring element on the brake pad before the brake pad is inserted into the mount.

This arrangement further has the advantage of taking up brake pad-to-mount clearance at the sides of the brake pad, such that brake pad rotation within the mount ("pad kick") is significantly limited. The limited rotation motion reduces the need for tall mount horns to control brake pad rotation, thereby permitting shorter horns and in turn thicker brake caliper sections above the horns to increase caliper fatigue and service life. The arrangement also eliminates the need for space-taking over-topping brake pad retention devices.

Another advantage of the use of the inventive spring retention element is that it provides a replaceable wear surface which protects the facing surfaces of the mount horns from wear, extending mount service life.

The inventive brake pad and spring retention device may be provided on only one side of the brake pad, or on both lateral sides to further reduce pad rotation motion.

The spring retention device is preferably formed from high-strength material, preferably heat-treated spring steel, and includes a pad vibration-reducing tension tab. Such an element is easily and cost-effectively produced, for example by a metal-stamping process.

The spring element protrusion which engages the side of the brake pad is preferably formed in a wedge-shape which resists "camming out" of the brake pad slot during the brake application.

Other objects, advantages and novel features of the present invention will become apparent from the following detailed description of the invention when considered in conjunction with the accompanying drawings.

DETAILED DESCRIPTION OF THE DRAWINGS

Figure 1:
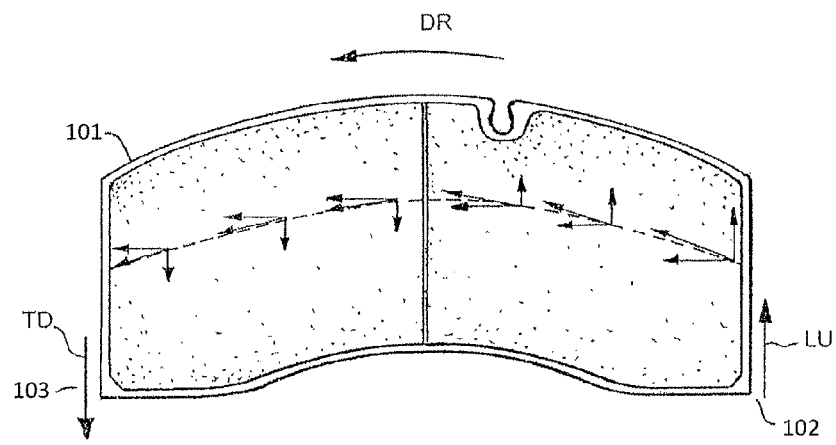
FIG. 1 is a schematic view of motions and forces resulting from application of a brake pad to a rotating brake disk.
Figure 2:
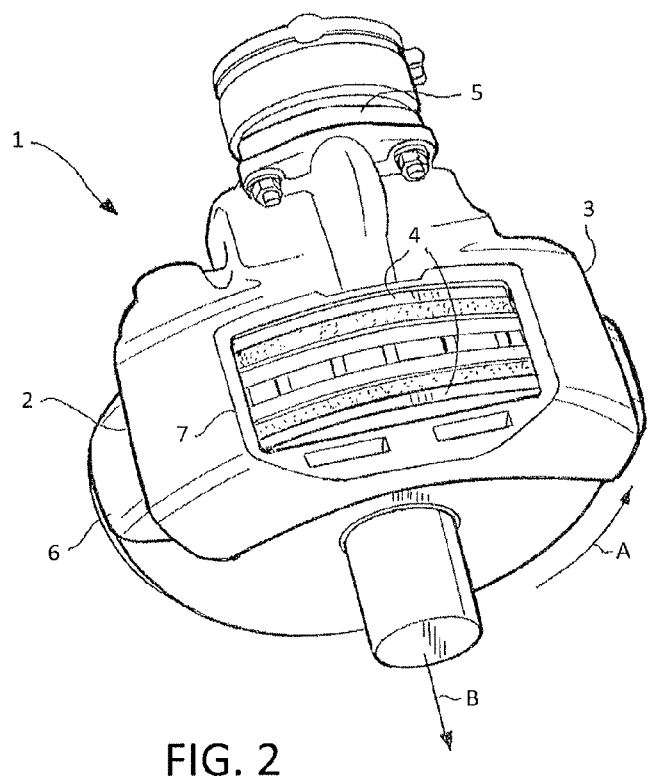
FIG. 2 is an oblique view of a disc brake in accordance with an embodiment of the present invention.

In the embodiment shown FIG. 2, a disc brake 1 of a commercial vehicle includes a brake disk 2, a brake caliper 3 straddling the brake disk 2. The brake disk 2 rotates in the direction A about axis B when the vehicle is moving in a forward direction. The caliper 3 is affixed to a mounting carrier 6 which in turn is fixed to a vehicle axle, typically via a torque plate or a brake spider (not illustrated). The caliper 3 is actuated by an actuator 5, in this embodiment a spring brake actuator which is controlled by pneumatic pressure from the vehicle. The actuator 5 acts upon a brake pad application mechanism contained within caliper 3 to press brake pads 4 against the brake disk 2 to slow the vehicle. The present invention is not restricted a particular type of brake caliper/mount arrangement (for example, a fixed carrier and a sliding caliper with a single-side brake pad application mechanism, or a fixed carrier and fixed caliper with two-sided brake pad application mechanisms).

Figure 3:
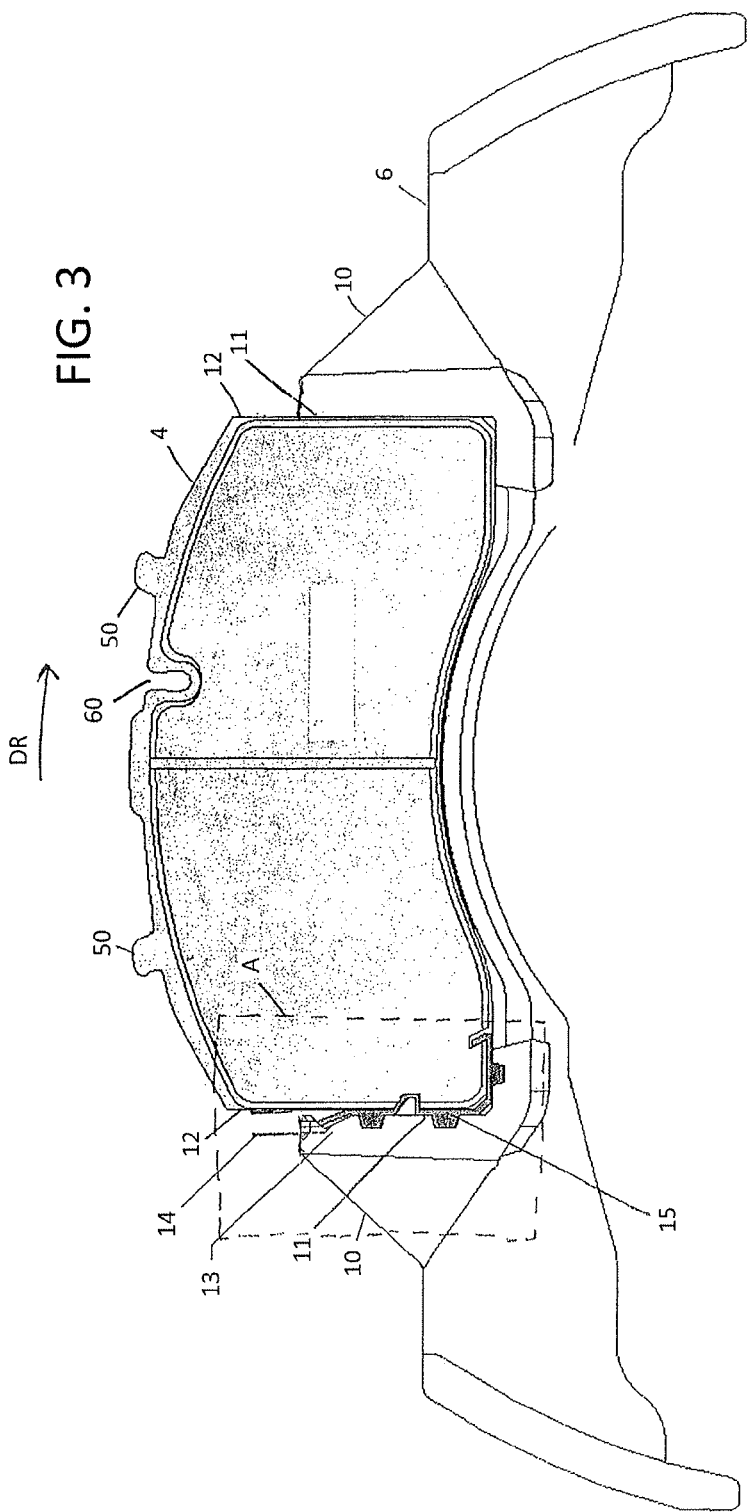
FIG. 3 is an elevation view of a carrier mount and brake pad in accordance with an embodiment of the present invention.

FIG. 3 shows an elevation view of a mount 6 and a brake application-side brake pad 4. It will be appreciated that the mount need not be a caliper-supporting carrier, i.e., the caliper may be mounted on a component separate from the mount, with only the brake pads being carried by the mount. The mount 6 includes horns 10 having brake pad contact faces 11. During brake application, the contact faces 11 support and receive loads transferred from a brake rotor (not illustrated) rotating in direction DR through the lateral sides 12 of the brake pad 4 to the mount 6.

In this embodiment, one spring element 15 is provided on one lateral side of the brake pad 4. Depending on the specific application and related factors (such as the amount of pad rotation control desired), a second spring element may be provided on the opposite lateral side of the brake pad 4, as shown for example in FIG. 6. The brake pad 4 may also include additional features, such as a slot 60 for receiving a brake pad wear sensor (not illustrated for clarity).

Figure 4:
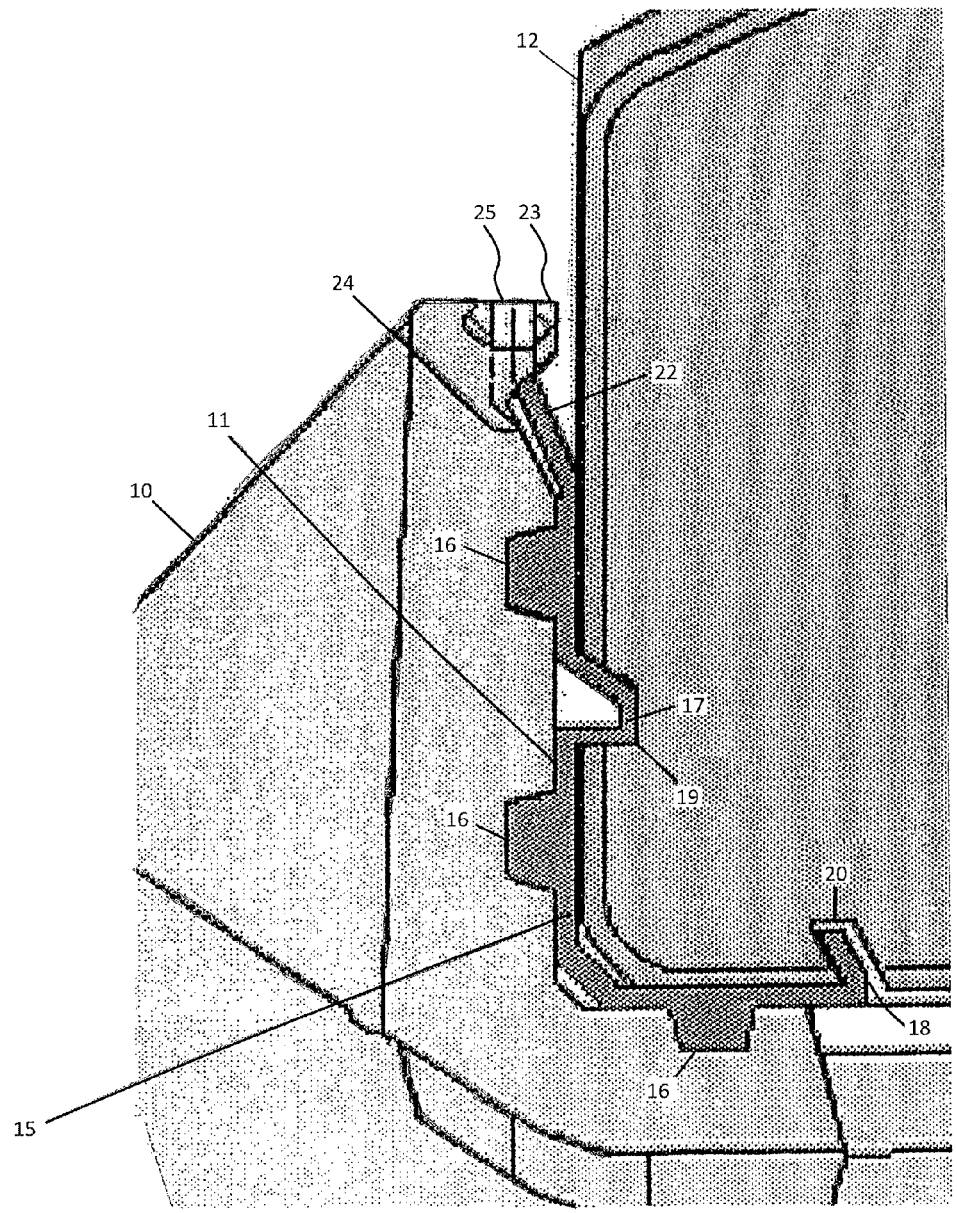
FIG. 4 is a detailed elevation view of a region of the mount and brake pad of the embodiment of FIG. 3.
Figure 5:
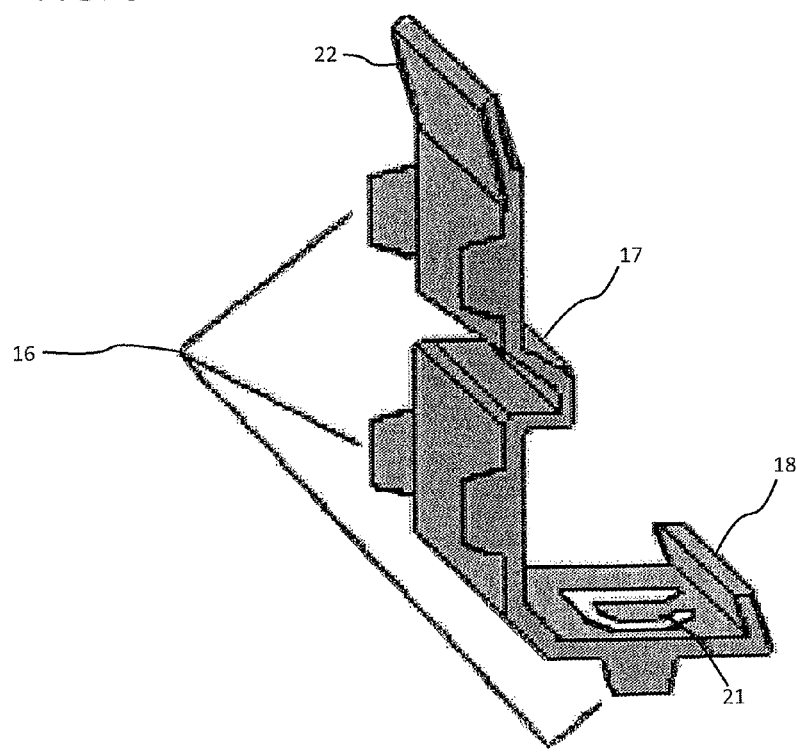
FIG. 5 is an oblique view of a spring element of the embodiment of FIG. 3.

A detailed view the region indicated by the letter "A" in FIG. 3 is shown in FIG. 4, and an oblique view of the spring element 15 shown in FIGS. 3 and 4 is illustrated in FIG. 5.

FIG. 4 shows a detailed view of the region in which the spring element 15 is positioned between the brake pad 4 and the mount 6. The spring element 15 has a plurality of alignment tabs 16, which are spaced to conform to the sides of mount face 11 to guide the brake pad 4 into position during brake pad installation in mount 6, as well as helping minimize back-and-forth movement of the spring. The spring element 15 also in this embodiment includes two retention features, a pad locking track 17 which engages a corresponding slot 19 in the lateral side of the brake pad 4, and a retaining tab 18 which engages a corresponding slot 20 on the lower edge of the brake pad 4. The spring element 15, pad locking track 17 and retaining tab 18 are preferably arranged such that the spring element 15 is self-retaining on brake pad 4 by elastic bending around the lower corner of the brake pad. The spring element 15 also includes a tension tab 21 to take up free play between the lower edge of the brake pad 4 and the mount 6, in order to suppress vibrations of the brake pad against the mount.

At the upper end of the spring element 15, an end portion 22 is angled outward away from the lateral side of the brake pad 4. As the brake pad is inserted into the mount 6, the end portion 22 is pressed elastically toward the brake pad 4 by the upper end 23 of the mount horn 10 until the end portion 22 reaches a lock profile 24 in the mount face 11. Once the end portion 22 is engaged in the lock profile 24, it cooperates with the mount horn 10 and the pad locking track 17 to retain the brake pad 4 in the mount 6 without the need for any pad retention mechanism over-topping the brake pad. One of ordinary skill will recognize that the entire end portion 22 of the spring element 15 need not be used as a locking feature. For example, a locking tab may be formed from a central region of the end portion 22, similar to the shape of the tension tab 21 shown in FIG. 5, to perform the pad retaining function.

Removal of a brake pad in this embodiment is facilitated by a hole 25 in the top of the mount horn 10 which passes through to the lock profile 24. A pin or other similar tool may be inserted into the hole 25 to press the end portion 22 toward the lateral side of brake pad 4 until the end portion 22 is free to pass upward along mount horn face 11. One of ordinary skill will recognize that other disengagement approaches may be used, such as extending a tab from the end portion 22 radially outward or inward (see FIG. 7), where the tab may be pressed toward the lateral edge of the brake pad 4 to disengage the end portion 22 from the lock profile 24 without requiring the use of a spring element disengaging tool.

In an alternative embodiment of the present invention, the lower spring element retaining tab 18 and its corresponding slot 20 may be omitted from the brake pad 4. Even without the retaining tab 18, the spring element 15 may be self-retaining on the brake pad if the pad locking track 17 and the bottom leg portion of the spring element 15 are separated by a distance which results in the spring element 15 being under sufficient tension when placed on the brake pad 4. In the case where the spring element 15 is not self-retaining, the retaining tab 18 and corresponding slot 20 still may be omitted, as the spring element 15 may be manually held to the brake pad 4 during brake pad installation, and the brake pad retention function will still be provided by the pad locking track 17 and spring element end region 22 once the brake pad 4 reaches its installed position. The spring element may also be affixed to the brake pad by other approaches, such as crimping of brake pad-facing retention tabs similar to alignment tabs 16 to the lateral edge of the brake pad.

In another embodiment of the present invention, the portion of the spring element below the brake pad lower edge may be omitted if the spring element and its protrusions are sized large enough to maintain a stable brake pad orientation during brake operation.

One of the features of the arrangement illustrated in FIGS. 3-5 is that there is no constraint against sliding motion of the brake pad 4 in the direction parallel to the brake disc rotation axis (i.e., toward or away from the brake disc) while spring element 15's alignment tabs 16 hold the spring element to the mount horn 10. The width of the spring element 15 in the direction parallel to the brake disc rotation axis must be sufficient to ensure that as the brake pad 4 wears, the brake pad cannot slide so far towards the brake, disc that the pad locking track 17 disengages the corresponding slot 19 in the brake pad 4, such that the brake pad would possibly migrate radially outward from the mount 6.

Figure 6:
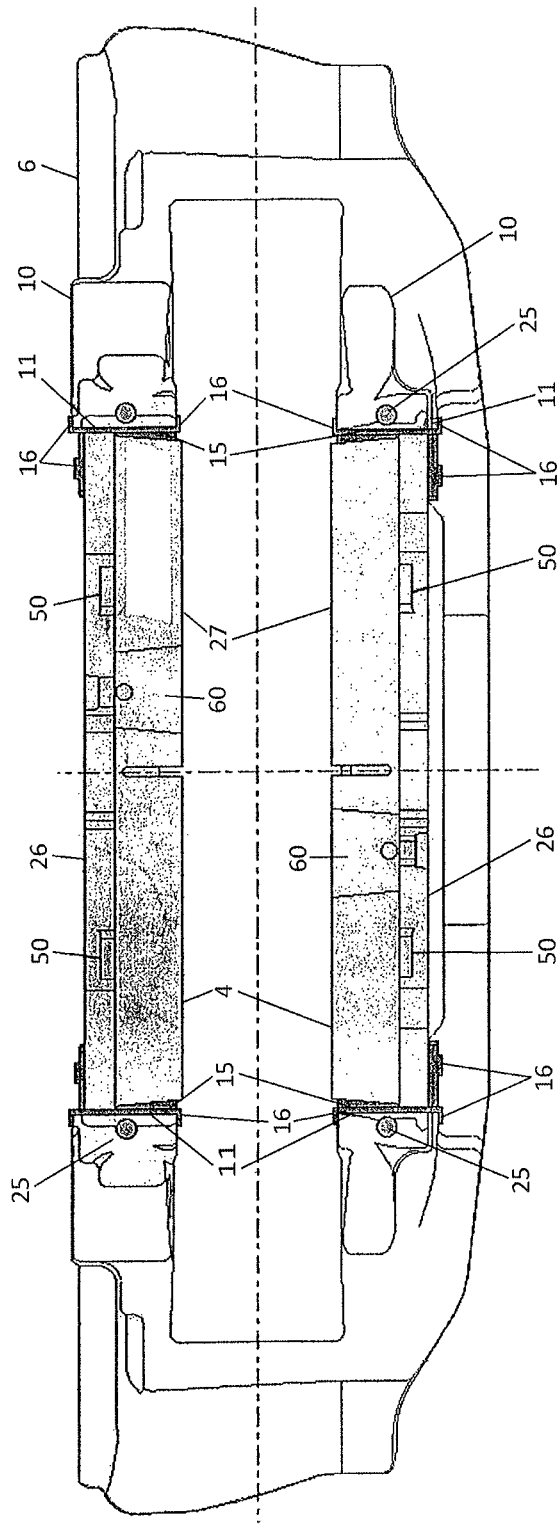
FIG. 6 is a plan view of a carrier mount and brake pads in accordance with an embodiment of the present invention.

FIG. 6 is a plan view of two opposing brake pads 4 positioned in mount 6. This figure illustrates the arrangement of the alignment tabs 16 of spring element 15 along the sides of mount horn face 11 and along the lower edge of the mount 6 to guide the brake pad 4 into the mount 6 and to prevent the spring element 15 from moving toward or away from the brake disc (not illustrated). As shown in this figure, the width of the spring element 15 is sufficient to ensure the backing plates 26 of the brake pads 4 will not slide out of the spring element 15 toward the brake disc, even when the brake pad has been worn to the point of removing all of the brake pad lining material 27 from the backing plate 26.

Figure 7:
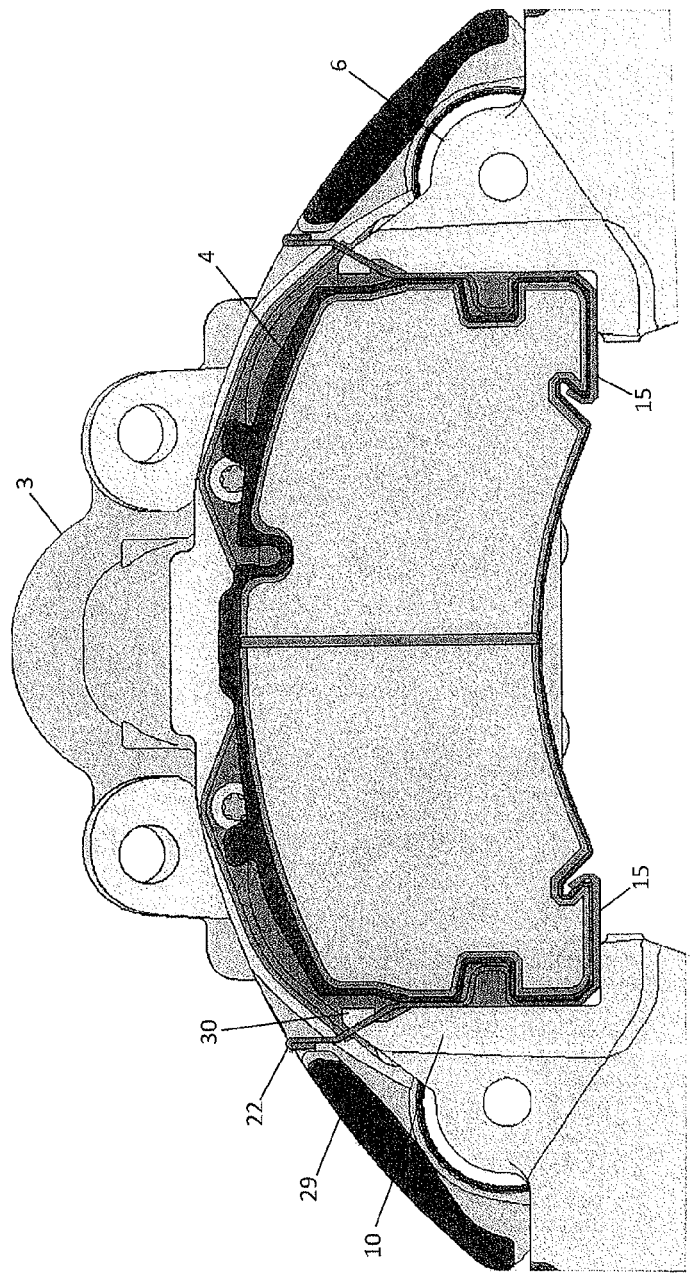
FIG. 7 is a plan view of a further embodiment of a spring element in accordance with the present invention.
Figure 8A:
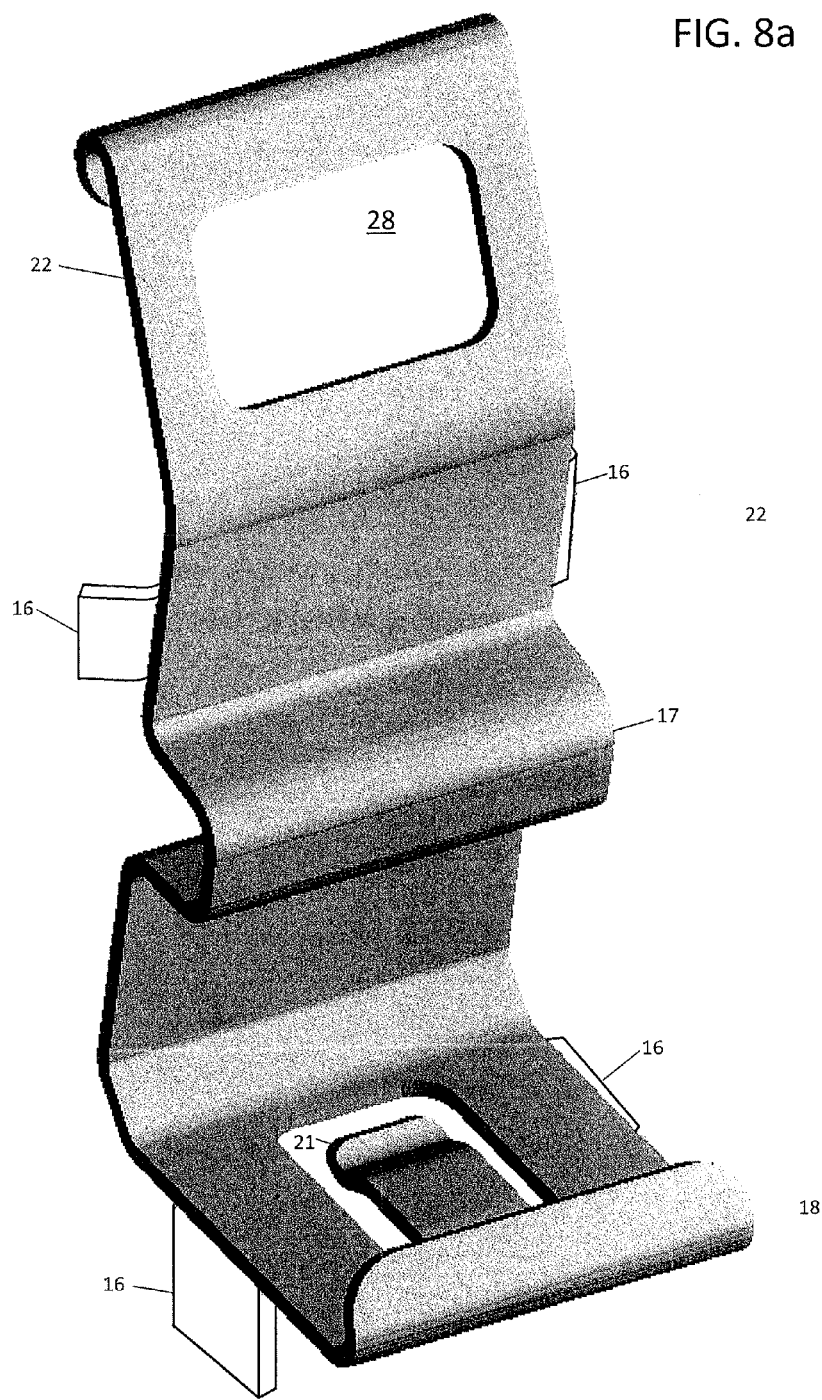
FIGS. 8a and 8b are oblique and side views, respectively of the spring element shown in FIG. 7.
Figure 8B:
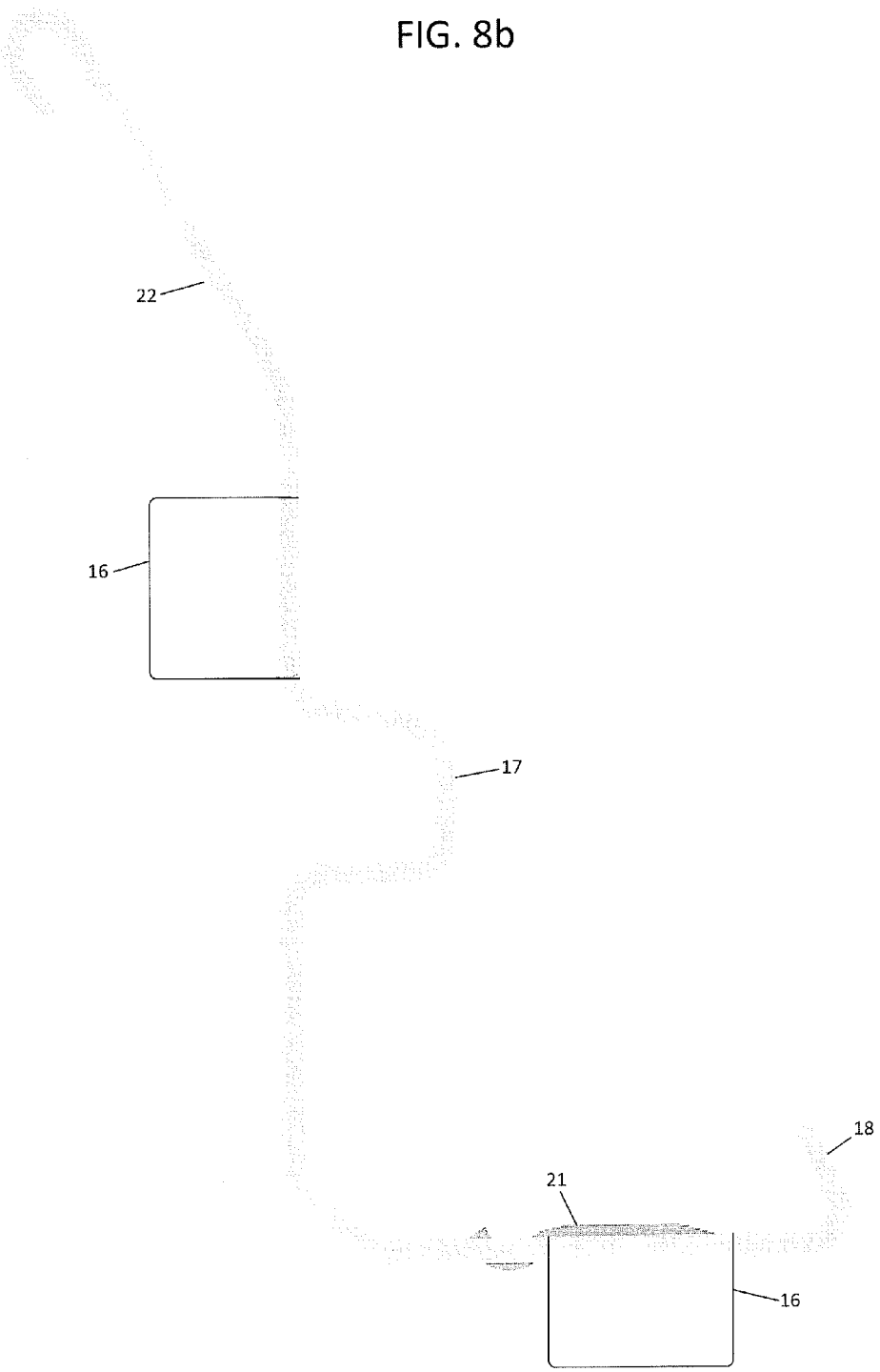
Figure 9:
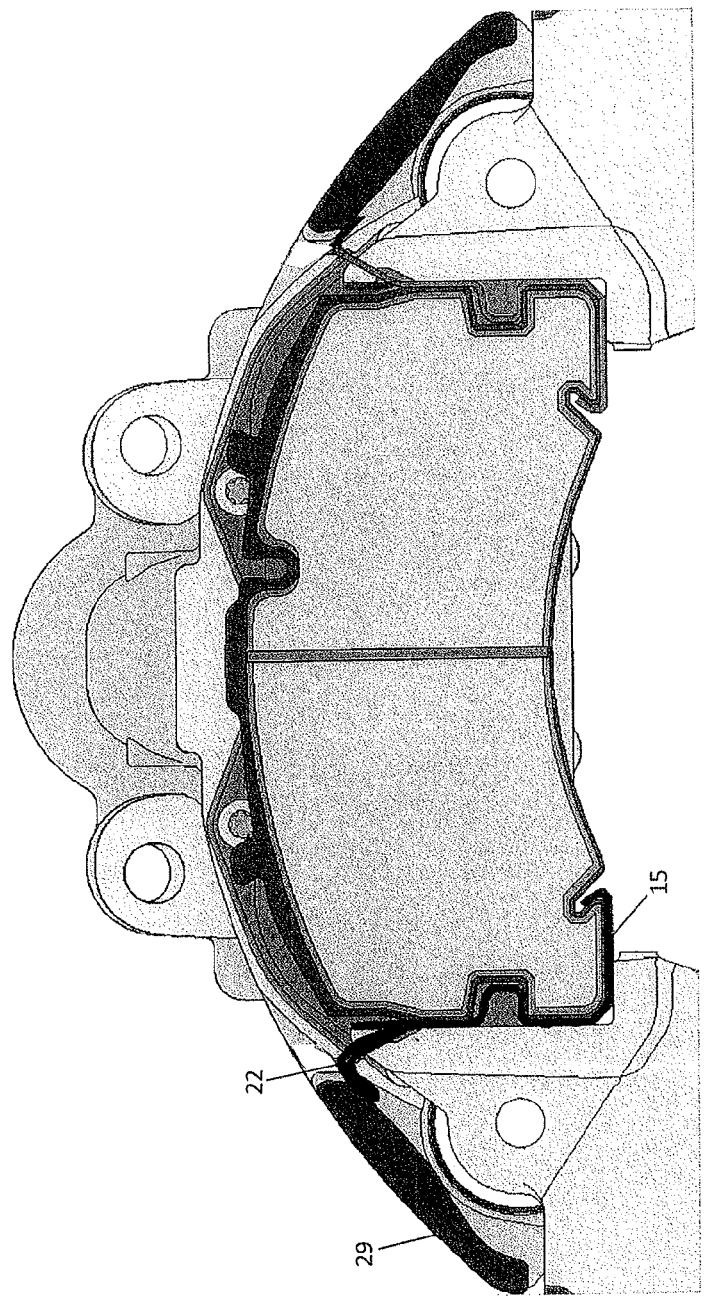
FIG. 9 is a plan view of another embodiment of a spring element in accordance with the present invention.
Figure 10:
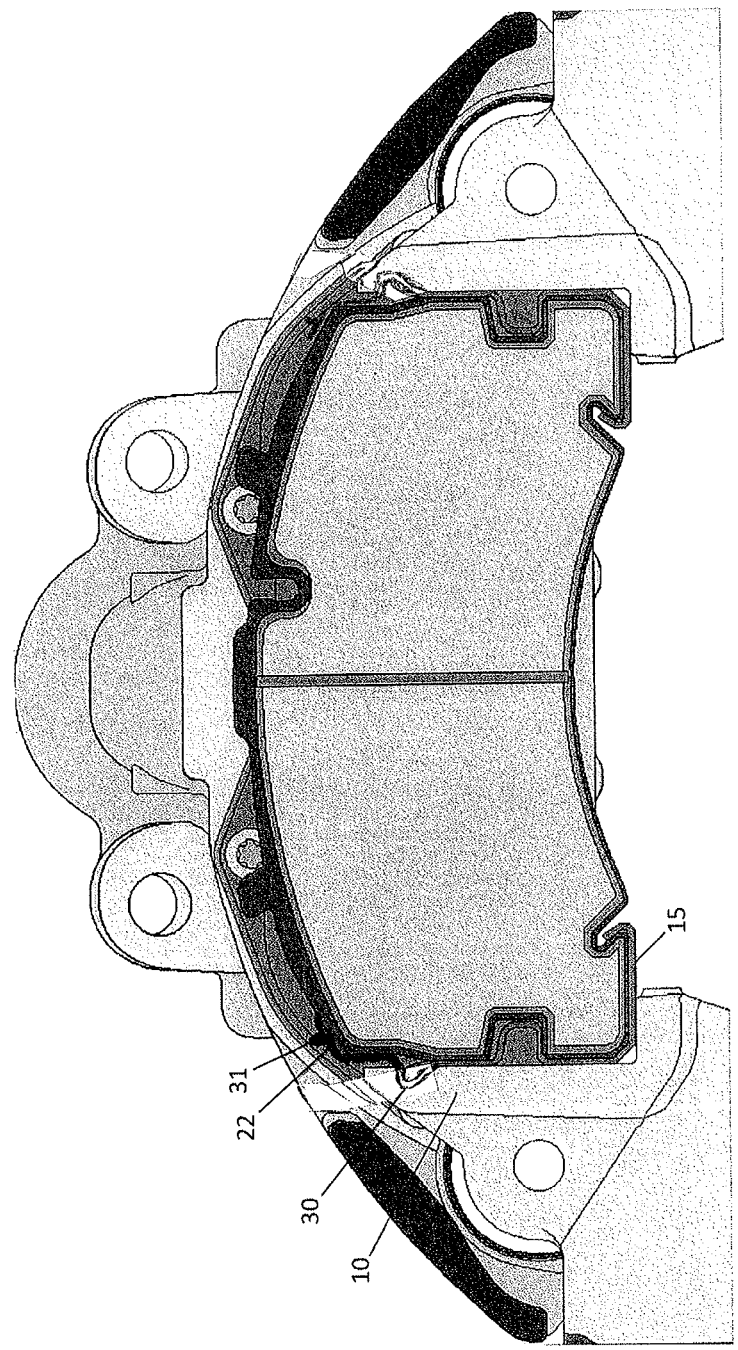
FIG. 10 is a plan view of an additional embodiment of a spring element in accordance with the present invention.

FIGS. 7-10 show alternative spring element embodiments. For example, FIGS. 7, 8a and 8b illustrate an embodiment in which the spring element end region 22 includes an aperture 28, and the upper end 23 of the mount horn 10 includes a corresponding hook-shaped portion 30 which engages the spring element 15 through the aperture 28. In this embodiment, the upper end of the end region 22 is located alongside a connecting portion 29 of the caliper which extends over the brake disc, where in may easily be reached to be pressed toward the center of brake pad 4 to disengage the hook-shaped portion 30 for withdrawal of the brake pad from the mount 6. Alternatively, depending on space constraints, as shown in FIG. 9 the upper end of the spring element 15's end region 22 may be configured to fit under the lower surface of the caliper connecting portion 29. An additional embodiment is shown in FIG. 10, in which the end portion 22 of spring element 15 is configured to generally conform to the shape of the upper corner of brake pad 4, and is provided with a tab 31 which may be used to deflect the upper end of end portion 22 away from brake pad 4 until it disengages from the hook-shaped portion 30 at the top of mount 10 to permit withdrawal of the brake pad 4.

The foregoing disclosure has been set forth merely to illustrate the invention and is not intended to be limiting. For example, rather than locating the portion of the spring element which engages the mount lock profile at the upper end of the portion of the spring element between the brake pad and the mount horn, a locking feature such as a tab or protrusion from the spring element may engage a lock profile much closer to the bottom of the mount horn. Because other such modifications of the disclosed embodiments incorporating the spirit and substance of the invention may occur to persons skilled in the art, the invention should be construed to include everything within the scope of the appended claims and equivalents thereof.

What is claimed is:

1. A brake pad retention system, comprising:
a brake pad;
a brake pad carrier mount; and
a brake pad retaining element,
wherein
the brake pad has a lateral side retention feature in a lateral side of the brake pad,
the brake pad carrier mount has a lock profile on a surface facing the lateral side of the brake pad,
the brake pad retaining element includes a first protrusion and a second protrusion arranged such that when the brake pad is at an installed position in the brake pad carrier mount, the brake pad retaining element is positioned between the brake pad and the brake pad carrier mount with the first protrusion located radially-inward from the second protrusion, the first protrusion engaging the brake pad lateral side retention feature and the second protrusion engaging the brake pad carrier mount lock profile, and
the brake pad retaining element is configured to be carried on the brake pad during brake pad insertion in a radially-inward direction and removal in a radially-outward direction from the brake pad carrier mount.

2. The brake pad retention system of claim 1, wherein the brake pad retaining element is a spring element.

3. The brake pad retention system of claim 2, wherein the first protrusion and second protrusion are configured to resist brake pad removal from the brake pad carrier mount when the brake pad is in the installed position.

4. The brake pad retention system of claim 3, wherein at least one of the brake pad carrier mount and the spring element is configured to permit the second protrusion to be manually disengaged from the brake pad carrier mount lock profile.

5. The brake pad retention system of claim 2, wherein the brake pad has a retention feature in a lower side of the brake pad, and the spring element is L-shaped and includes a third protrusion arranged to engage the brake pad lower side retention feature in a portion of the spring element between the lower side of the brake pad and the brake pad carrier mount.

6. The brake pad retention system of claim 4, wherein
the brake pad has a retention feature in a lower side of the brake pad, and
the spring element is L-shaped and includes a third protrusion arranged to engage the brake pad lower side retention feature in a portion of the spring element between the lower side of the brake pad and the brake pad carrier mount.

7. The brake pad retention system of claim 1, further comprising:
a second brake pad retaining element configured to be positioned between a lateral side of the brake pad opposite the brake pad lateral side adjacent to the first brake pad retaining element.

8. The brake pad retention system of claim 1, wherein
the second protrusion includes an aperture configured to engage the brake pad carrier mount lock profile.

9. The brake pad retention system of claim 8, wherein
the lock profile is hook-shaped profile configured to extend though the second protrusion aperture.

10. A brake pad retention system, comprising:
a brake pad;
a brake pad carrier means for receiving the brake pad; and
a brake pad retaining means for retaining the brake pad in the brake pad carrier means,
wherein
the brake pad has a lateral side retention feature in a lateral side of the brake pad,
the brake pad retaining means include surfaces which engage corresponding features of the brake pad and the brake pad carrier means to retain the brake pad in the brake pad carrier means when the brake pad retaining means is positioned between the brake pad and the brake pad carrier means, the brake pad retaining means surfaces including a surface that engages the brake pad at a location radially inward of a surface that engages the brake pad carrier means and
the brake pad retaining means is configured to be carried on the brake pad during brake pad insertion in a radially-inward direction and removal in a radially-outward direction from the brake pad carrier means.

11. A brake pad retaining element, comprising:
a retaining plate having a brake pad-facing surface and a brake pad carrier-facing surface;
a first protrusion on the brake pad-facing surface configured to engage a brake pad lateral side surface of a brake pad;
a second protrusion on the brake pad carrier-facing surface configured to engage a brake pad carrier surface;
wherein
the first protrusion and the second protrusion protrude from the retaining plate in opposite directions,
when in an installed position in a brake the retaining plate the first protrusion is located radially inward from the second protrusion, and
the brake pad retaining element is configured to be carried on the brake pad lateral side surface when the second protrusion is moved in a radially-inward direction into a position to engage the brake pad carrier surface and when the second protrusion is moved in a radially-outward direction out of engagement with the brake pad carrier surface.

12. The brake pad retaining element of claim 11, further comprising:
retaining element alignment features extending from lateral sides of the retaining element toward the brake pad carrier-facing side of the retaining element.

13. The brake pad retaining element of claim 11, wherein the retaining plate has an L-shape, further comprising:
a third protrusion on the brake pad-facing surface configured to engage a brake pad bottom side surface.

14. The brake pad retaining element of claim 13, wherein
the first protrusion and the third protrusion are arranged to cooperate to self-retain the retaining element on the brake pad lateral side surface and the brake pad bottom side surface.

15. The brake pad retaining element of claim 11, wherein
the second protrusion is configured to be elastically compressed to permit disengaging the retaining element from the brake pad carrier surface.

16. The brake pad retaining element of claim 11, wherein
the second protrusion includes an aperture configured to engage the brake pad carrier mount lock profile.

* * * * *